United States Patent [19]

Tallon et al.

[11] 4,188,655
[45] Feb. 12, 1980

[54] VEHICLE HEADLAMP AND MOUNTING ASSEMBLY

[75] Inventors: Thomas G. Tallon, Metamora; Gerald A. Harris, Fraser, both of Mich.

[73] Assignee: Chrysler Corporation, Highland Park, Mich.

[21] Appl. No.: 902,125

[22] Filed: May 2, 1978

[51] Int. Cl.² ............................................. B60Q 1/00
[52] U.S. Cl. .................................... 362/80; 362/275; 362/283; 362/287; 362/289; 362/419; 362/421
[58] Field of Search ............... 362/275, 283, 287, 289, 362/322, 371, 419, 80, 421, 428

[56] References Cited

U.S. PATENT DOCUMENTS 3,848,121  11/1974  Colucci ............................... 362/428

Primary Examiner—Stephen J. Lechert, Jr.
Attorney, Agent, or Firm—Baldwin & Newtson

[57] ABSTRACT

A headlamp and integral mounting assembly having three peripherally spaced integrally formed mounting means, which cooperate with headlamp support means to provide three suspension points from which the lamp is pivotally mounted for independent adjustment from two of the points for limited pivotal rotative movement about a pair of coplanar, orthogonally related and intersecting axes, one of which axes is contained in an axial plane passing through the geometric center of the lamp unit and the other of which axes is displaced from the geometric center and located outwardly of the lamp unit.

20 Claims, 4 Drawing Figures

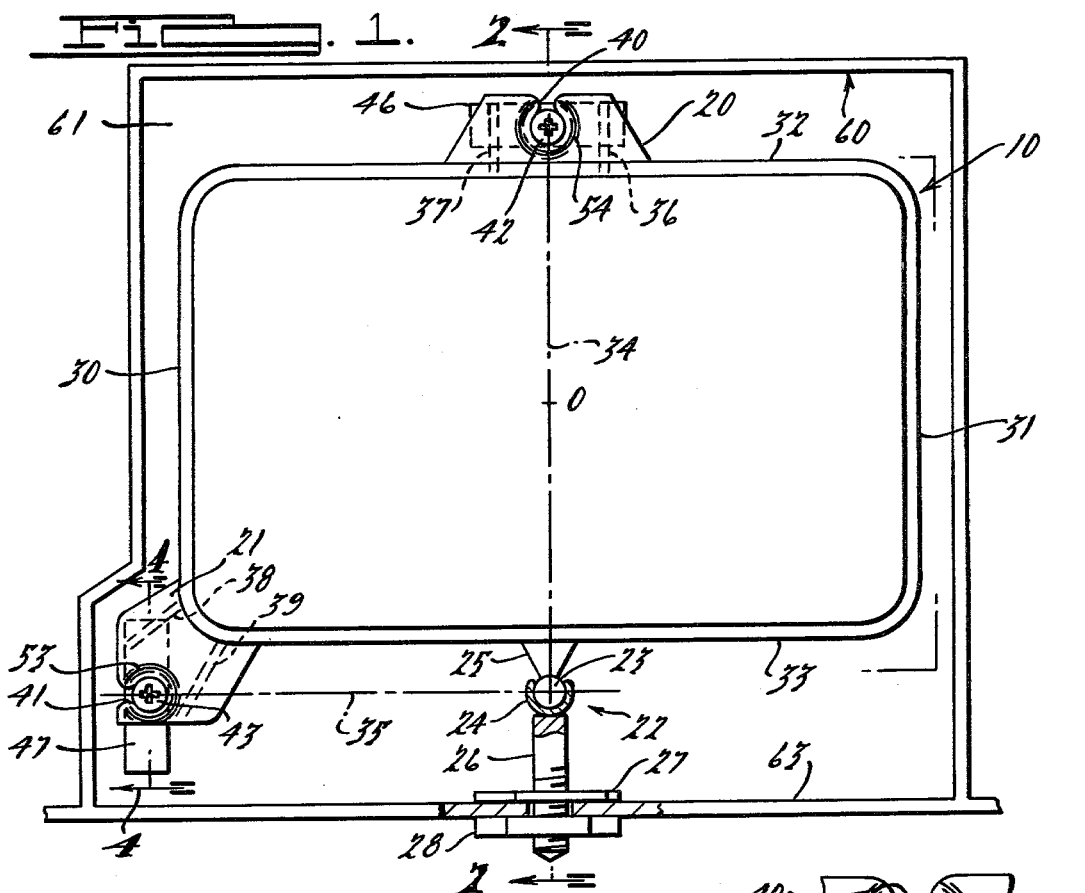
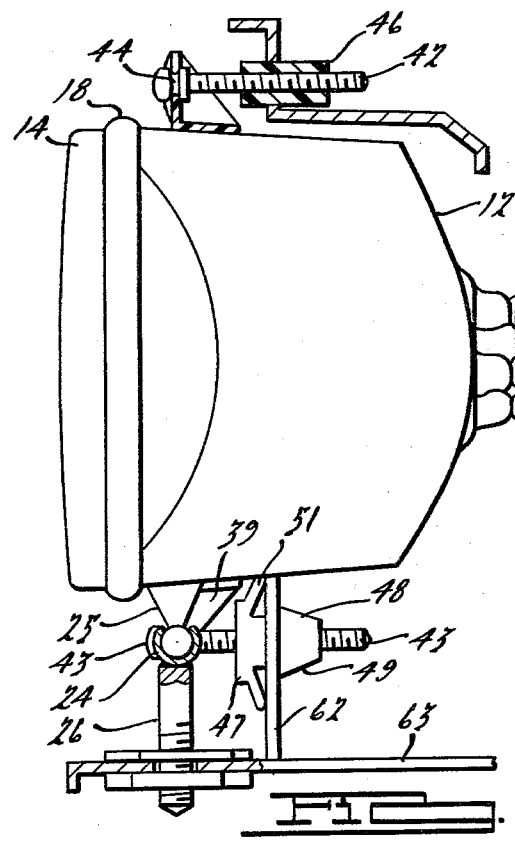
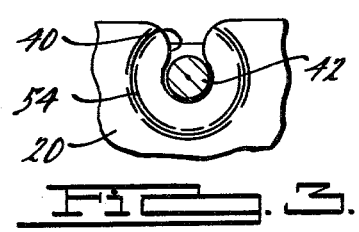
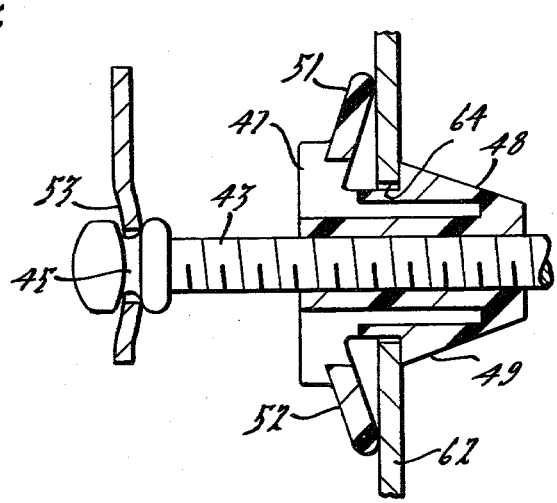
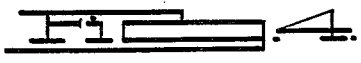

VEHICLE HEADLAMP AND MOUNTING ASSEMBLY

BACKGROUND AND FIELD OF THE INVENTION

This invention relates to vehicle headlamps and more particularly, to an adjustable headlamp and mounting assembly specially suited for use in automotive-type vehicles.

The invention seeks to provide an improved form of vehicle headlamp and adjustable mounting assembly, which eliminates the multiplicity of separate mounting components, including mounting rings, shells, attachment screws, etc. heretofore employed in present forms of vehicle headlamp mounting assemblies.

Other objects are to provide a light weight, low cost vehicle headlamp and adjustable mounting therefor that uses a minimum number of parts and is of economical manufacture.

A headlamp and mounting assembly according to the invention includes a plastic headlamp unit having three peripherally spaced mounting means integrally formed on and projecting outwardly from its periphery. The mounts cooperate with headlamp support means to provide three suspension points to which the lamp is unyieldably positively secured and is mounted for independent adjustment from two of the points for limited rotative movement about a coplanar pair of orthogonal intersecting axes, one of which is contained in the axial plane passing through the geometric center of the unit and the other of which axes is displaced from the geometric center thereof and located outwardly of the lamp unit.

One example of the invention is illustrated in the accompanying drawings wherein:

FIG. 1 is a front elevational view of a headlamp unit and mounting assembly in accordance with the invention; and FIG. 2 is a side elevation and sectional view taken along the line 2—2 of FIG. 1;

FIG. 3 is a fragmentary view of a part of FIG. 1 showing the shape of a slot therein; and FIG. 4 is an enlarged sectional view taken in the direction of 4—4 of FIG. 1.

DESCRIPTION OF THE PREFERRED EMBODIMENT

Referring to the drawings, the headlamp unit 10 is shown as a rectangular headlamp, which is received in a generally similarly shaped indentation or opening 61 in a headlamp support or mounting panel 60, affixed to or forming a part of the forward portion of a motor vehicle.

The lamp unit 10, which may be of the sealed beam or separate bulb variety, includes a generally parabolic dish-shaped reflector 12 and a translucent lens element 14, which are preferably formed of a synthetic inorganic based plastic, such for example as polycarbonate, instead of vitreous or glass, material. Interiorly, the reflector has a highly polished, reflecting silvered or aluminized coated surface and recieves one or more incandescent lamp filaments positioned at the focal point of the reflector and which may be exposed or enclosed in a glass, quartz, gas or halogen filled single or multiple filament lamp bulb suitably supported or mounted in the reflector and electrically energizable through terminals, as 16, shown at the rear of the reflector. Lens 14, which may be formed of a clear plastic polycarbonate material as Lexan for example, has a generally rectangular configuration with a curved frontal surface in accordance with the desired lens prescription and is shown as having a peripheral bead or edge 18 by which it is suitably affixed, as by sealing, to close the open end of the reflector.

In accordance with the invention, the lamp unit is attached by a three point suspension mounting to the mounting panel in which its attitude may be separately and independently adjusted about a generally vertically oriented axis passing through two of the three suspension points, and about a generally horizontally extending axis passing through a third and one of the first two suspension points by portions of the lamp cooperating with the mounting panel. The portions of the lamp mounting carried on or formed on the lamp include a pair of radially outwardly extending flanges 20, 21 and one element 23 of a universal pivot, joint or ball or socket mounting 22 whose other element 24 is affixed to the mounting panel.

Mounting flange 20 is of generally L-shaped formation and is shown positioned between the two shorter parallel sides 30 and 31 of the lamp unit and located on the upper longer side 32 thereof and on the vertical axis 34 passing through the geometric center 0 of the lamp unit. Mounting flange 21 is laterally displaced from the vertical axis 34 and is shown located at the southwest corner and at the intersection of the sides 30 and 33 of the lamp unit.

Each of the mounting flanges 20 and 21 has a thick planar frontal surface, which is structurally reinforced as by a pair of rearwardly extending spaced apart webs 36, 37 and 38, 39 integrally molded with the respective flanges on the reflector, and has an elongated slotted opening as 40, 41 therein. The slots may be shaped as shown in FIG. 3, in which they are shown as being of a slightly reduced dimension at the respective entrances thereof so as to provide a snap-in fit or retention for a respective one of a pair of headlamp aiming adjusting screws 42, 43. Each adjusting screw has a circumferentially extending, V-shaped annular groove as 44, 45 therein by which it is retained in the aforesaid slot 40, 41 in a respective one of the mounting flanges 20, 21 and further has a threaded body which is threadably received in a flanged fastening nut 46, 47 molded of plastic material, as Nylon, for example.

As illustrated in FIG. 4 herein, each fastening nut is of a generally rectangular cross section and has a blunt tapered rearward portion by which it is inserted through a rectangular shaped opening 61 in a rearwardly displaced upstanding portion 62 of the mounting panel 60. Each of the nuts is further characterized by a pair of inwardly yieldable shoulders 48, 49 on opposite sides of the nut and includes a pair of outwardly extending yieldable flanges or ears as 51, 52 that bear against the front face of the aforesaid upstanding portion 62 of the mounting panel in which the nut is thus securely retained.

Ball element 23 of the pivotable or ball and socket mounting 22 is shown located on the longer lower side 33 of the headlamp unit in the vertical axial plane thereof and is formed on a depending conical base or pedestal 25, which is suitably affixed to and preferably integrally molded with the reflector 12. The ball element cooperates with the aforesaid ball shaped, resilient socket element 24 in which it is received with a snap-in type and frictional retention and is universally moveable in or with three directions of rotational freedom. The ball socket element 24, which may be formed of plastic or metallic material preferably of a different frictional coefficient than the spherical ball element, is shown as having a threaded body or pedestal portion 26 by which its elevation may be adjusted for or relative to different sized openings 61 in the mounting panel to which it is adjustably fastened and locked, as by and between a pair of threaded nuts 27, 28 on opposite sides of the lower wall or floor 63 of the mounting panel.

As shown in FIG. 4, the sidewalls of the annular grooves 44 and 45 in the heads of the adjusting screws 42, 43 have a generally curved or spherical contour to cooperate with a dished spherically contoured indentation or depression 53, 54 formed in the frontal face of the mounting flanges 20, 21 and surrounding the slots 40, 41 in the mounting flanges to facilitate limited rotary movement of the lamp unit mounting flanges about the respective adjusting screws when the latter are independently moved to adjust the attitude of the lamp unit for automotive headlamp aiming purposes.

Inward or outward movement of the upper adjusting screw 42, for example, by insertion of a cross-splined drive tip into the cross-slotted head of the screw, pivotally moves the entire lamp unit about a horizontal axis 35 located externally of the lamp unit and passing through the center of the ball and socket pivot mounting 22 and the center of the lower adjusting screw 43 at the corner mounting flange 21. While inward or outward movement of the corner adjusting screw 43 pivotally moves the entire lamp unit about the central vertical axis 34 passing through the center of the adjusting screw 42 at the upper mounting flange 20 and the center of the ball and socket mounting 22.

While the lamp unit has been shown of rectangular configuration, it is apparent that the mounting arrangement discussed herein may be used with the other forms of lamps and lamp shapes.

What is claimed is:

1. A vehicle headlamp unit comprising a reflector and a lens attached to the reflector, said unit having three peripherally spaced mounting means projecting outwardly from its periphery and providing three suspension points from which it may be unyieldably positively secured and adjustably positioned relative to the vehicle from two of the points for independent rotative movement about a coplanar pair of orthogonal and intersecting axes, one of said axes contained in a longitudinal axial plane passing through the geometric center of the unit and the other of said axes displaced from the geometric center thereof, a first and second one of said mounting means located opposite each other on the said one of said axes and the third mounting means located opposite said second mounting means and contained therewith on the other of said orthogonal axes, said first and third mounting means adjustably connectable to the vehicle, said second mounting means comprising one element of a rotary ball joint pivotal connection between the headlamp and the vehicle fixing the headlamp against linear translational movement relative to the vehicle and providing a common pivot rotationally translatable at the intersection of both of said axes for independent limited rotative movement of said lamp unit about the said other of said axes from linear translational adjustment movement of said first mounting means and about the said one of said axes from independent linear translational adjustment movement of said third mounting means.

2. A headlamp unit in accordance with claim 1 in which at least the reflector is formed of plastic material and said mounting means are carried on said reflector.

3. A headlamp unit in accordance with claim 2 in which said mounting means are of integral formation on said lamp unit.

4. A headlamp unit in accordance with claim 1 in which said first and third mounting means are flanges carried on said reflector and said second mounting means is one element of a ball and socket-type mounting.

5. A headlamp unit in accordance with claim 4 in which said second mounting means is a spherical ball element projecting from and carried on the periphery of said reflector.

6. A headlamp unit in accordance with claim 1 in which said headlamp unit is of rectangular configuration and said first mounting means is located on one side of said unit and on the said one of said axes and said second mounting means is located on the opposite side of said unit on the said one of said axes and the third mounting means is located on the said opposite side of said lamp unit and laterally displaced from the said one of said axes.

7. A headlamp unit in accordance with claim 4 in combination with a headlamp support means carrying the other element of said ball and socket-type mounting means to receive the said one element of the ball and socket mount on said lamp unit, and fastening means for adjustably fastening said lamp unit by said first and third mounting means to said support means while permitting independent adjustment of the attitude of the headlamp about said axes.

8. The invention in accordance with claim 7 wherein said adjustable fastening means comprises a pair of headlamp adjusting screws each engaged at one end with a different one of said first and third mounting means and threadable screw receiving means on said support means each receiving a different one of said adjusting screws.

9. The invention in accordance with claim 8 wherein said threadable screw receiving means comprises a pair of nuts each secured to said support means.

10. The invention in accordance with claim 7 wherein the said other element of said ball and socket type mounting means is adjustable along the said one of said axes to adjust the position of said lamp unit relative to said support means.

11. The invention in accordance with claim 8 wherein each of the flanges of said first and third mounting means has an elongated slot therein and each of said adjusting screws has an annular circumferential groove thereon by which it is captured and retained in a different one of said slots in said mounting flanges.

12. The invention in accordance with claim 11 wherein said second mounting means on said headlamp unit is a ball element which is received in a cooperating socket element carried on said support means.

13. A rectangular headlamp unit for a vehicle and comprising a reflector and a lens attached to said reflector, a pair of mounting flanges integrally formed on said reflector for mounting of said lamp unit and adjustment of the attitude thereof about an orthogonally intersecting pair of transverse horizontal and vertical axes, one of said axes contained in a longitudinal axial plane passing through the geometric center of the headlamp unit, one of said integral mounting flanges located centrally on one side of said headlamp unit and the other of said integral mounting flanges located adjacent the intersection of the opposite side of said headlamp unit and another side of the latter intersecting the said one side said opposite side and of said headlamp unit, and a third mounting member integrally formed on the said opposite side of the said headlamp unit and located opposite the said one of said mounting flanges on the said one of said axes and forming one element of a rotary ball joint connection between the headlamp unit and the vehicle for rotary pivotal rotational movement of the headlamp in two directions at the intersection of the axes while fixing it against linear translational movement relative thereto.

14. The invention in accordance with claim 12 wherein the annular circumferential groove on each of said adjusting screws is of a generally V-shaped formation and wherein each of said first and third flange mounting means has a spherically arcuately shaped dished depression therein accommodating limited relative rotary movement between the adjusting screw and its mounting flange.

15. A vehicle headlamp assembly comprising,
a headlamp unit having a parabolic reflector portion and a lens portion attached to the reflector portion,
a pair of rigid unyieldable mounting flanges carried on the headlamp at two locations each contained on a respective one of a coplanar pair of orthogonal intersecting axes oriented horizontally transversely and vertically of the vehicle with one of the axes contained in a longitudinal axial plane passing through the geometric center of the headlamp unit,
a pair of adjustable aiming and attachment screws rotatably engaged with and longitudinally captured in a respective one of said mounting flanges and adjustably threadably connected therebetween and the vehicle for rotary adjustment and longitudinal translational movement relative to the vehicle, and
a rotary ball joint pivotal connection between the headlamp unit and the vehicle fixing the headlamp against relative linear translational movement thereto at the intersection of said axes while pivotally connecting the headlamp thereat for independent rotational translational movement relative to the vehicle about a respective one of said axes from linear translational movement of a mounting flange on the other of said axes by rotary adjustment of its aiming screw.

16. A headlamp assembly in accordance with claim 15 above wherein said rotary ball element joint connection is a ball and socket one of which elements is carried on the headlamp unit and is rotatable relative to the other element which is stationary and affixed to the vehicle.

17. A headlamp assembly in accordance with claim 16 above wherein the ball element of said ball joint connection is carried on the headlamp unit.

18. A headlamp assembly in accordance with claim 16 above wherein the ball element of the rotary ball joint connection is frictionally retained in the socket element.

19. A headlamp assembly in accordance with claim 15 above wherein the mounting flanges and the rotatable element of the ball and socket connection carried on the headlamp unit are of integral formation therewith.

20. A headlamp assembly in accordance with claim 19 above wherein the headlamp is rectangularly shaped and formed of plastic polycarbonate, inorganic material.

* * * * *